(12) United States Patent
Kim

(10) Patent No.: US 8,843,958 B2
(45) Date of Patent: Sep. 23, 2014

(54) BROADCAST RECEIVING APPARATUS AND METHOD FOR DISPLAYING AND SELECTING CHANNEL INFORMATION

(71) Applicant: Samsung Electronics Co., Ltd., Gyeonggi-do (KR)

(72) Inventor: Mi-kyung Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/867,816

(22) Filed: Apr. 22, 2013

(65) Prior Publication Data

US 2013/0239147 A1  Sep. 12, 2013

Related U.S. Application Data

(63) Continuation-in-part of application No. 11/636,643, filed on Dec. 11, 2006, now abandoned.

(30) Foreign Application Priority Data

Dec. 22, 2005 (KR) .................. 10-2005-0128016

(51) Int. Cl.
| | |
|---|---|
| *G06F 3/00* | (2006.01) |
| *H04N 21/482* | (2011.01) |
| *H04N 21/422* | (2011.01) |
| *H04N 21/431* | (2011.01) |
| *H04N 5/445* | (2011.01) |
| *H04N 5/44* | (2011.01) |

(52) U.S. Cl.
CPC ........ *H04N 21/4821* (2013.01); *H04N 21/4823* (2013.01); *H04N 21/42215* (2013.01); *H04N 21/4828* (2013.01); *H04N 2005/44517* (2013.01); *H04N 2005/44556* (2013.01); *H04N 21/4312* (2013.01); *H04N 5/44513* (2013.01); *H04N 2005/4421* (2013.01)
USPC .............................. 725/38; 348/731; 348/734

(58) Field of Classification Search
USPC .............................. 725/38; 348/731, 732, 734
See application file for complete search history.

(56) References Cited

U.S. PATENT DOCUMENTS

| | | | |
|---|---|---|---|
| 5,532,754 | A | 7/1996 | Young et al. |
| 6,600,522 | B1 | 7/2003 | Kim |

(Continued)

FOREIGN PATENT DOCUMENTS

| | | | |
|---|---|---|---|
| KR | 1999-0025624 | A | 4/1999 |
| KR | 11-177387 | A | 7/1999 |

(Continued)

OTHER PUBLICATIONS

Office Action issued Aug. 31, 2010 in counterpart Korean Application No. 10-2005-0128016.

(Continued)

*Primary Examiner* — Farzana Hossain
(74) *Attorney, Agent, or Firm* — Sughrue Mion, PLLC

(57) ABSTRACT

A broadcast receiving apparatus and a broadcast receiving method are provided. The broadcast receiving apparatus includes a signal receiving part for receiving a broadcast signal; an inputting part for selecting one of a plurality of broadcast channels, the inputting part including an alphanumeric key which is pressed to generate a first input and is released to generate a second input; a displaying part for displaying, according to the first input, an indication of the plurality of broadcast channels; and a controller, which receives the first and second inputs, to control the displaying part to sequentially display a series of individually highlighted channels of the plurality of broadcast channels, automatically while the alphanumeric key is pressed and held; to determine a time of receipt of the second input, the time of second input receipt coinciding with the highlighting of one of the series of individually highlighted channels; and to control the signal receiving part to tune to the broadcast channel highlighted at the time of the second input receipt.

20 Claims, 5 Drawing Sheets

(56) References Cited

U.S. PATENT DOCUMENTS

| | | |
|---|---|---|
| 6,766,526 B1 | 7/2004 | Ellis |
| 7,224,409 B2 * | 5/2007 | Chin et al. .................. 348/732 |
| 7,565,673 B1 | 7/2009 | Brusky et al. |
| 2003/0097656 A1 | 5/2003 | Tsubouchi |
| 2003/0123840 A1 | 7/2003 | Fujinami |
| 2003/0137605 A1 | 7/2003 | Chin et al. |
| 2004/0031041 A1 | 2/2004 | Windheim et al. |
| 2004/0172648 A1 | 9/2004 | Xu et al. |
| 2005/0062619 A1 | 3/2005 | Jellicoe |

FOREIGN PATENT DOCUMENTS

| | | |
|---|---|---|
| KR | 2001-0013381 A | 2/2001 |
| KR | 2001-0055250 A | 7/2001 |
| KR | 2002-0076597 A | 10/2002 |
| KR | 2003-0062851 A | 7/2003 |
| WO | 98/56173 | 12/1998 |
| WO | 03/058954 A2 | 7/2003 |

OTHER PUBLICATIONS

"When." www.dictionary.com. pp. 1-4, Oct. 2011.

* cited by examiner

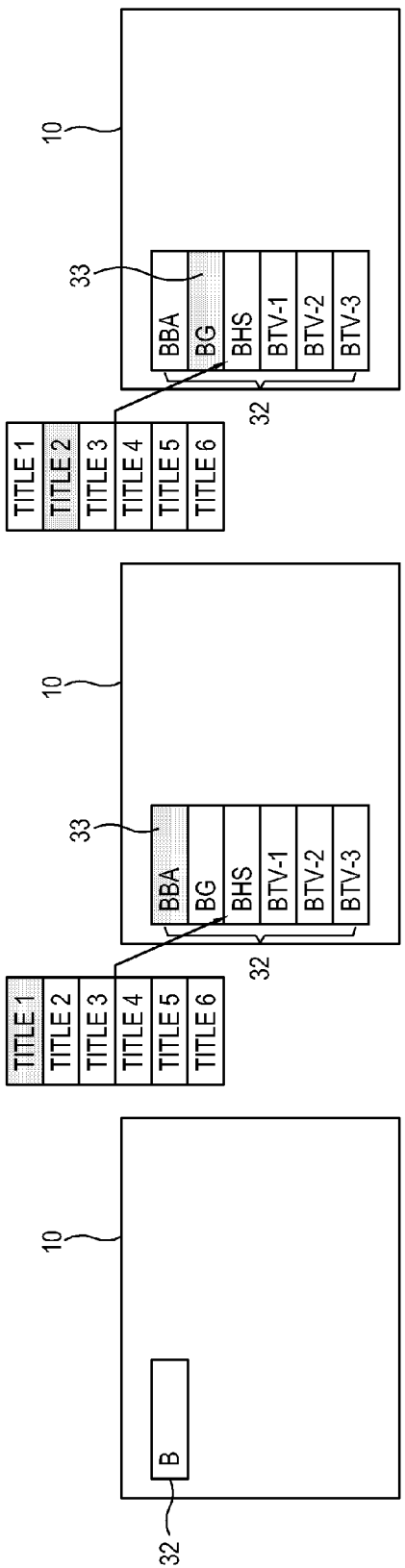

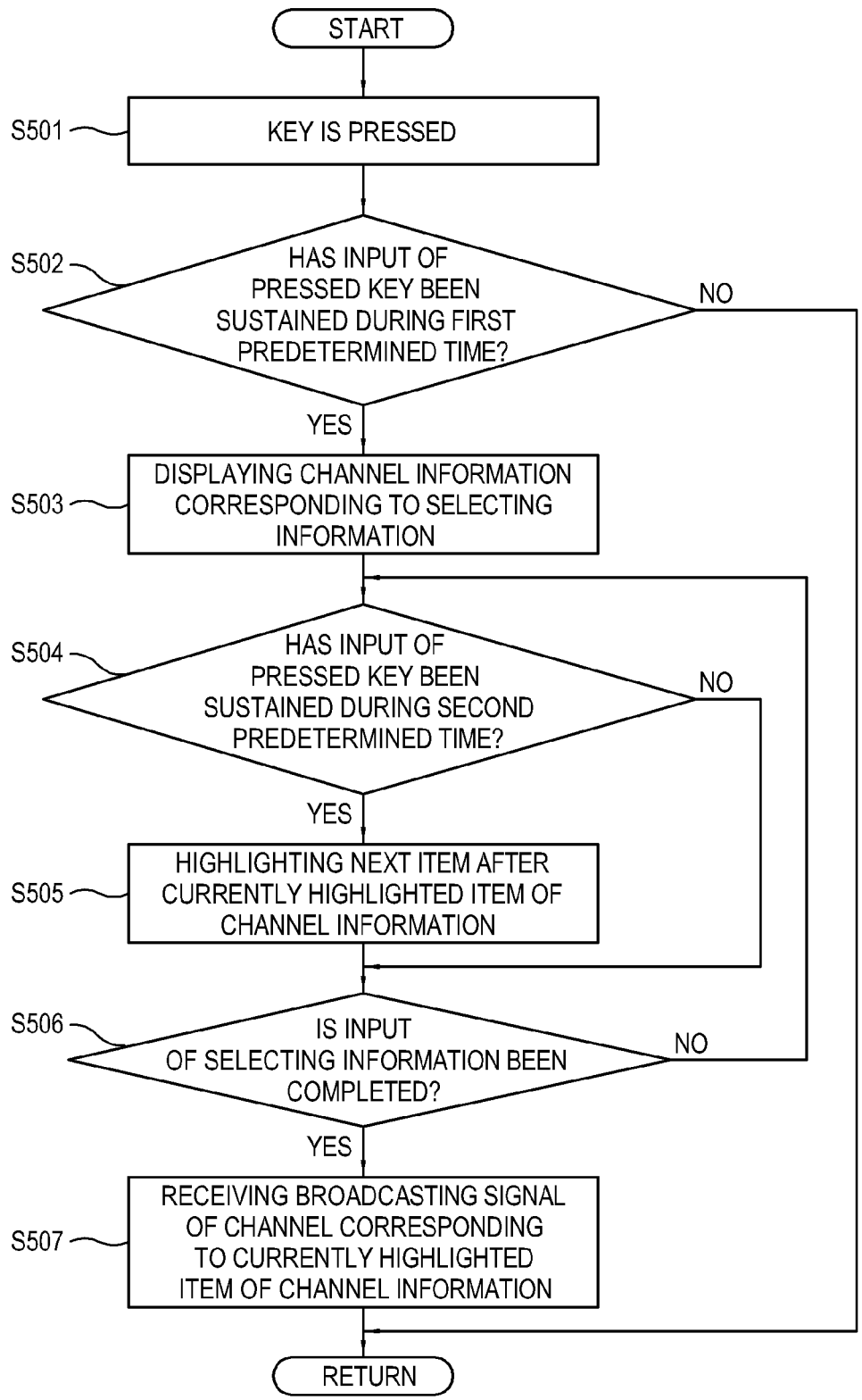

BROADCAST RECEIVING APPARATUS AND METHOD FOR DISPLAYING AND SELECTING CHANNEL INFORMATION

CROSS-REFERENCE TO RELATED APPLICATIONS

This application is a continuation-in-part of application Ser. No. 11/636,643, filed Dec. 11, 2006, which claims the benefit of Korean patent application No. 10-2005-0128016, filed on Dec. 22, 2005, in the Korean Intellectual Property Office, the disclosure of which is incorporated herein by reference.

BACKGROUND OF THE INVENTION

1. Field of the Invention

The present invention relates to a content display apparatus and a method thereof, and more particularly, to a broadcast receiving apparatus and a method thereof capable of selecting a channel promptly without difficulty.

2. Description of the Related Art

A content display apparatus of the present invention may display various types of content. As an example of the content display apparatus described below is a broadcast receiving apparatus. The broadcast receiving apparatus such as a television receiver (TV) receives various types of broadcast signal such as that of a terrestrial, cable, or satellite broadcast, and processes the received broadcast signal. The broadcast receiving apparatus displays an image on the basis of the processed broadcast signal. The broadcast signal received by the broadcast receiving apparatus corresponds to one of a plurality of channels. The broadcast receiving apparatus receives a broadcast signal of a channel selected by a user. This process is referred to as a tuning process.

According to a conventional broadcast receiving apparatus, an image of a received channel is displayed on a screen for a user. Then, the user is allowed to change a channel by directly inputting a channel number of a desired channel or by manipulating directional arrow keys on a remote controller.

In the modern broadcast environment, however, where there are hundreds of channels such as digital TV broadcast, cable TV broadcast and the like, it is not easy for a user to select a desired channel promptly. For example, in the case of selecting a channel having a channel number of 267-3, it is cumbersome to enter the numbers and the hyphen one by one. Although some systems may permit selection of the channel 267 followed by selection of the digit 3 using directional arrow keys, this is also cumbersome. Selecting a channel using its name, such as BTV-3, is similarly cumbersome.

Furthermore, the modern broadcast environment presents the user with hundreds of channels from which to choose. This too is encumbering. For example, while viewing a program on a particular channel, a user may wish to select another channel broadcasting a program of the same genre. In this situation, the presence of hundreds of channel choices acts to impede a desired selection and complicates the entry of the desired selection, thereby increasing the time required for channel selection.

SUMMARY OF THE INVENTION

Accordingly, it is an aspect of the present invention to provide a broadcast receiving apparatus and a method enabling a prompt selection of a desired channel and reducing channel selection difficulty.

It is another aspect of the present invention to provide a content display apparatus a method that reduces the time required for channel selection and that simplifies channel selection.

It is another aspect of the present invention to provide a broadcast receiving apparatus and a method that reduces the time required for channel selection and that simplifies channel selection.

Additional aspects and/or advantages of the present invention will be set forth in the description which follows or, will be obvious from the description, or may be learned by practice of the present invention.

The foregoing and/or other aspects of the present invention can be achieved by providing a broadcast signal receiving apparatus, comprising: a signal receiving part for receiving a broadcast signal; an inputting part for selecting one of a plurality of broadcast channels, the inputting part including an alphanumeric key which is pressed to generate a first input and is released to generate a second input; a displaying part for displaying, according to the first input, an indication of the plurality of broadcast channels; and a controller, which receives the first and second inputs, to control the displaying part to sequentially display a series of individually highlighted channels of the plurality of broadcast channels, automatically while the alphanumeric key is pressed and held; to determine a time of receipt of the second input, the time of second input receipt coinciding with the highlighting of one of the series of individually highlighted channels; and to control the signal receiving part to tune to the broadcast channel highlighted at the time of the second input receipt.

According to another aspect of the invention, the broadcast signal includes program genre information according to broadcast channel.

According to another aspect of the invention, the broadcast signal receiving apparatus further comprises an information storing part to store channel information corresponding to the plurality of broadcast channels, the channel information including the program genre information stored according to broadcast channel.

According to another aspect of the invention, the broadcast signal may include electronic program guide.

According to another aspect of the invention, the indication of the plurality of broadcast channels comprises channel numbers and titles of each of programs.

Another aspect of the invention can be achieved by providing, a content display apparatus, comprising: a data receiving part for receiving a plurality of contents; an inputting part for selecting one of the plurality of contents, the inputting part including an alphanumeric key which is pressed to generate a first input and is released to generate a second input; a displaying part for displaying, according to the first input, an indication of the plurality of contents; and a controller, which receives the first and second inputs, to control the displaying part to sequentially display a series of individually highlighted indication of the plurality of contents, automatically while the alphanumeric key is pressed and held; to determine a time of receipt of the second input, the time of second input receipt coinciding with the highlighting of one of the series of individually highlighted indication; and to control the signal receiving part to tune to the content highlighted at the time of the second input receipt.

Another aspect of the invention can be achieved by providing a broadcast signal receiving method comprising: receiving a broadcast signal; receiving a selection signal from an inputting part for selecting one of a plurality of broadcast channels, wherein the inputting part includes an alphanumeric key which is pressed to generate a first input and is released to generate a second input; displaying an indication of the plurality of broadcast channels according to the first input; sequentially displaying a series of individually highlighted channels of the plurality of broadcast channels, automatically while the alphanumeric key is pressed and held; determining a time of receipt of the second input, the time of second input receipt coinciding with the highlighting of one of the series of individually highlighted channels; and tuning the broadcast channel highlighted at the time of the second input receipt.

BRIEF DESCRIPTION OF THE DRAWINGS

The above and/or other aspects and advantages of the present invention will become apparent and more readily appreciated from the following description of the embodiments, taken in conjunction with the accompanying drawings of which:

FIGS. 4A-4E are diagrams of sample screens of the displaying part of FIG. 1, respectively illustrating steps of another channel selecting process according to an embodiment of the present invention; and FIG. 5 is a flowchart of an operation of the broadcast receiving apparatus according to an embodiment of the present invention.

DETAILED DESCRIPTION OF THE PREFERRED EMBODIMENT

Figure 1:
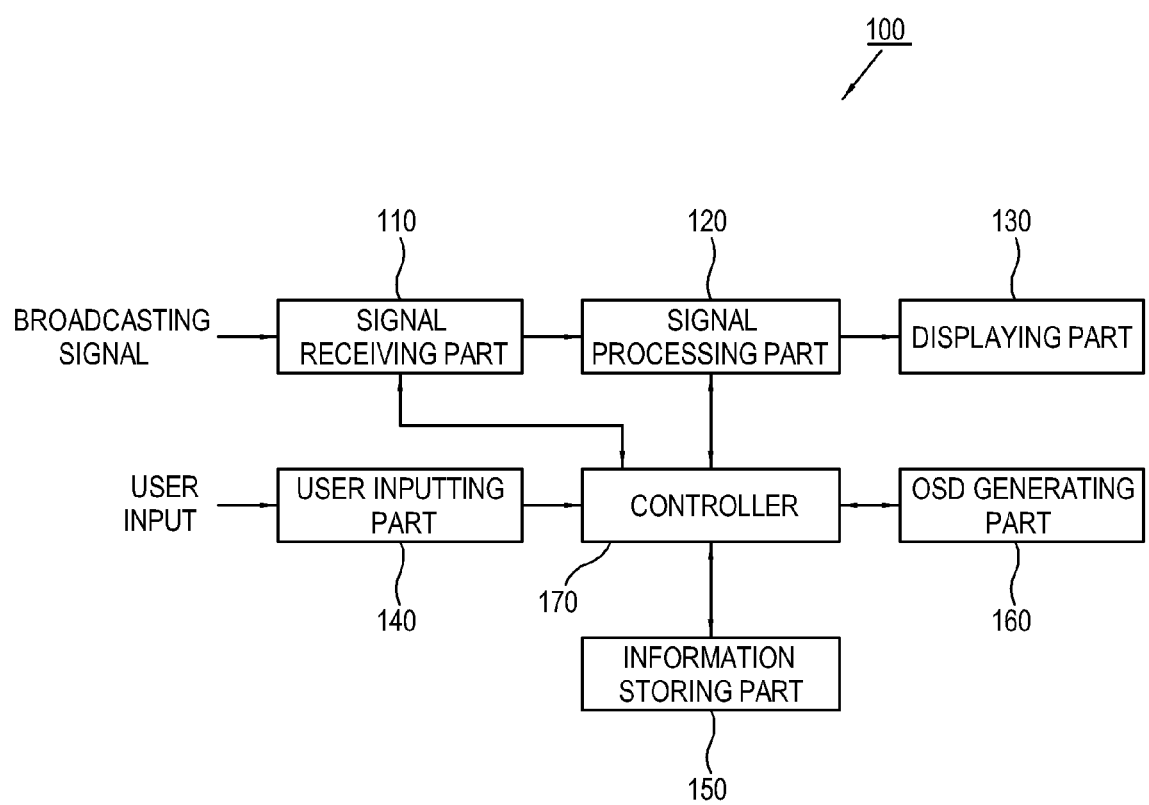
FIG. 1 is a schematic block diagram of a broadcast receiving apparatus according to an exemplary embodiment of the present invention.

Reference will now be made in detail to the embodiments of the present invention, examples of which are illustrated in the accompanying drawings, wherein like reference numerals refer to like elements throughout.

Referring to FIG. 1, a broadcast receiving apparatus 100 according to an embodiment of the present invention comprises a signal receiving part 110, a signal processing part 120, a displaying part 130, a user inputting part 140, an information storing part 150, an OSD generating part 160, and a controller 170. The broadcast receiving apparatus 100 receives various types of broadcast signal such as that of a terrestrial, cable, or satellite broadcast, and processes the received broadcast signal. The broadcast receiving apparatus 100 displays an image of the processed broadcast signal. The broadcast receiving apparatus 100 may be realized with a television receiver (TV), which may be in the form of a digital television broadcast receiving device, a set-top box (STB) type device, a computer-implemented device (e.g., a computer card), an IPTV-compatible device, or any device for receiving the above-mentioned various types of broadcast signal and having channels to select. In addition to audio and video components, the broadcasting signal may include a data signal carrying electronic program guide (EPG) information. The EPG describes the programs broadcast on each channel and includes programming details for each broadcast program, such as the program's title, broadcast time, and broadcast channel. In particular, the EPG will include program genre information for each program, indicating for example whether a corresponding program is tagged as a program of comedy, drama, movie, sports, news, etc.

The signal receiving part 110, which may be realized with a tuner, receives the broadcast signal by tuning to one channel among a plurality of channels. That is, the signal receiving part 110 is tuned to receive a broadcast signal corresponding to a channel selected by a user according to a control of the controller 170. The signal receiving part 110 is tuned to the broadcast signal with reference to a frequency corresponding to the selected channel.

The signal processing part 120 processes the broadcast signal received by the signal receiving part 110, so that an image can be displayed on the displaying part 130. The signal processing part 120 may perform a decoding function for decoding image information from the received broadcast signal, a scaling function for scaling the resolution of an image decoded according to properties of the displaying part 130 and a user setting, and a picture enhancement function for enhancing picture quality. It is preferable but not necessary that the signal processing part 120 processes a signal according to broadcast signal type.

The displaying part 130 displays an image on the basis of the broadcast signal processed by the signal processing part 120. The displaying part 130 may be variously realized. For example, the displaying part 130 may employ a cathode-ray tube (CRT), a liquid crystal display (LCD), a plasma display panel (PDP), a digital light processing (DLP) projector, an organic light-emitting diode (OLED) device, a surface-conduction electron-emitter display (SED), or a field emission display (FED).

The user inputting part 140 receives a user instruction. A user inputs selecting information via the user inputting part 140 to select one of plural channels. The selecting information according to an embodiment of the present invention may comprise any alphanumeric character, i.e., a number or letter. The user inputting part 140 may be realized as a remote controller, or other such manipulating panel for user selection and input, comprising at least one button (alphanumeric key) corresponding to the alphanumeric character.

The information storing part 150 stores channel information corresponding to a plurality of channels. Channel information according to an embodiment of the present invention may comprise a channel number having at least one number or a channel name having at least one letter. The information storing part 150 may further store program genre information corresponding to a plurality of channels. Thus, the channel information stored in the information storing part 150 may comprise program genre information. The program genre information may be stored as a table in which a broadcast program may be referenced by, for example, its title, according to the program's broadcast channel and broadcast time. In the table, all broadcast programs may be related to the genre of the broadcast program of a currently tuned channel. The table of the channel information may be in the form of an EPG, which may be received together with the broadcast signal and then stored and updated as desired. Necessary data for operation of the controller 170 may also be stored in the information storing part 150.

The OSD generating part 160 generates OSD data corresponding to channel information of a plurality of channels. The signal processing part 120, according to a control of the controller 170, processes an image on the basis of a broadcast signal and another image on the basis of OSD data generated by the OSD generating part 160 so that both of these images are displayed on the displaying part 130 as one image.

The controller 170 controls various other elements of the broadcast receiving apparatus 100. In accordance with the user inputting the selecting information, i.e., the alphanumeric character, the controller 170 controls the displaying part 130 so that at least one item of channel information corresponding to an item of inputted selecting information is displayed. Also, the controller 170 controls the signal receiving part 110 so that, among the channels of the displayed channel information, a broadcast signal corresponding to an item of channel information selected according to an input of selecting information is received.

FIGS. 2A-2E respectively illustrate steps of a channel selecting process performed according to an operation of the controller 170. In this instance, the selecting information comprises a number and the channel information comprises a channel number having at least one number.

Figure 2A:
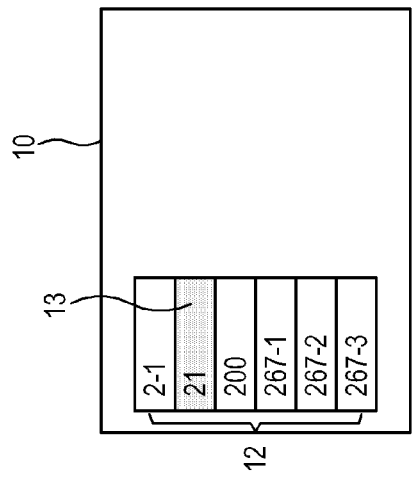
FIGS. 2A-2E are diagrams of sample screens of the displaying part of FIG. 1, respectively illustrating steps of a channel selecting process according to an embodiment of the present invention.

When the controller 170 determines that a user is attempting to input selecting information, e.g., a number, through the user inputting part 140, the controller 170 controls the OSD generating part 160 to generate OSD data for displaying a channel selector 12 as an OSD image on a screen 10 of the displaying part 130. Here, the determination is made by simply detecting the initial pressing of an alphanumeric key of the user inputting part 140. In FIG. 2A, the pressed alphanumeric key corresponds to the number "2," and the channel selector 12 displays the inputted number. That is, the controller 170 may determine that the number "2" is inputted when an alphanumeric key corresponding to the number "2" is pressed, and the channel selector 12 generated by the OSD generating part 160 provides the user with a visual indication of the inputted number in correspondence to the pressed alphanumeric key.

Figure 2B:
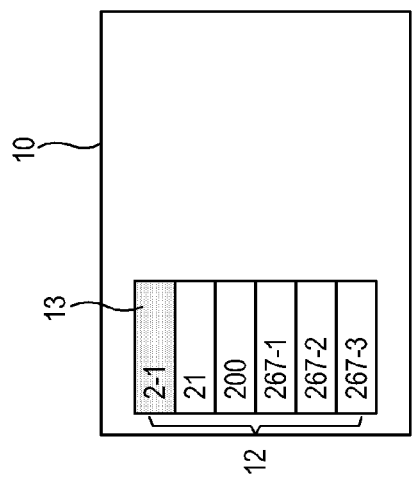

The controller 170 then determines whether the pressed alphanumeric key is continuously pressed during a predetermined first time. In other words, the controller 170 determines whether the pressed alphanumeric key is pressed and held for at least the duration of a first time period. If so, the controller 170 may determine that the number corresponding to the pressed alphanumeric key is being inputted as selecting information. The first time period may be, for example, 1 second. After the passing of the first time period, the controller 170 searches the channel information stored in the information storing part 150, to retrieve channel information related to the number of the pressed alphanumeric key. In this case, the retrieved channel information comprises channel numbers. In FIG. 2B, the retrieved channel information is displayed in the channel selector 12 as a list of items of channel information (channel numbers), including the channel information items of "2-1," "21," "200," "267-1," "267-2," and "267-3," each of which is a channel number and relates to the number "2" of the pressed alphanumeric key as shown in FIG. 2A. That is, the controller 170 controls the OSD generating part 160 so that the channel selector 12 indicating the results of the searched channel information is displayed on the screen 10 of the displaying part 130. Therefore, in effect, once the first time period has passed, the continuously pressed alphanumeric key becomes a type of search key.

Figure 2C:
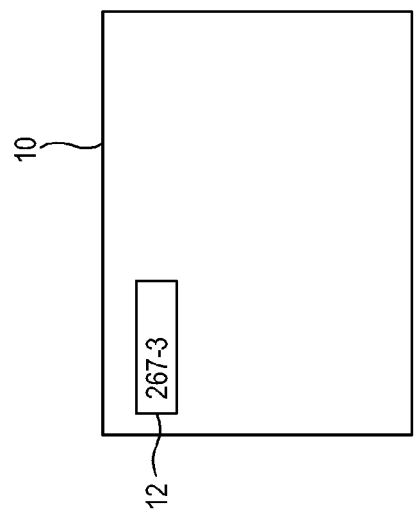
Figure 2D:
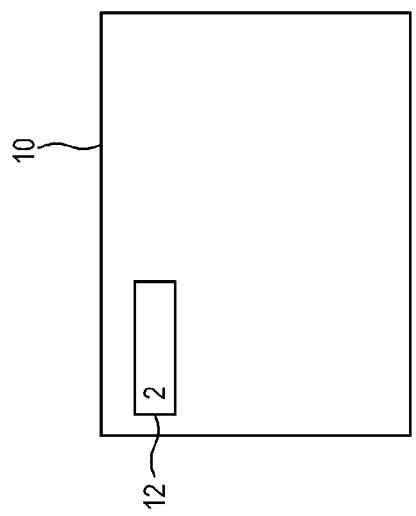

Referring to FIGS. 2B-2D, the controller 170 controls the OSD generating part 160 so that each of a plurality of channel numbers is sequentially highlighted by displaying the channel number in a shifting highlight box 13. Under the control of the controller 170, the channel number "2-1" is initially highlighted (FIG. 2B) and is displayed among the channel information search corresponding to the alphanumeric key ("2") that is pressed for the first time period. With the channel information of the selector 12 thus displayed, the controller 170 determines whether the alphanumeric key is continuously pressed during a predetermined second time. In other words, the controller 170 determines whether the pressed alphanumeric key is pressed and held for at least the duration of the first time period plus a second time period. If so, the controller 170 may determine that the user wishes to make a channel selection from among the channels of the displayed results of the channel information search. The second time period may be, for example, 1 second. After the passing of the second time period, which begins as the first channel number is highlighted, the next channel number of the list of channel information items, namely, the channel number "21," is highlighted under the control of the controller 170 (FIG. 2C). In the same way, the controller 170 continues to control the OSD generating part 160 so that all of the channel numbers of the displayed channel selector 12 are highlighted sequentially according to the continuous pressing of the same alphanumeric key. Here, the continuous pressing is achieved by pressing and holding the alphanumeric key corresponding to the number "2," until the last channel number of the list of channel information items, namely, the channel number "267-3," is highlighted under the control of the controller 170 (FIG. 2D).

Figure 2E:
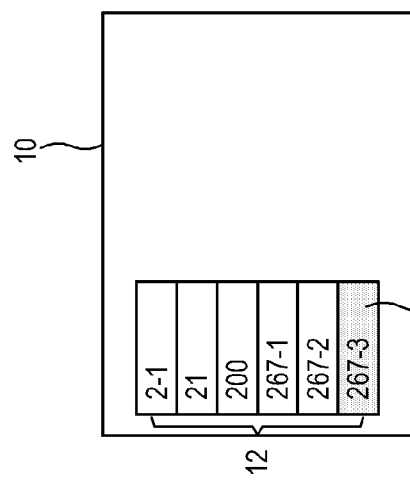

When the controller 170 detects the completion of an input of selecting information, that is, when the corresponding alphanumeric key is released, the controller 170 determines that the item of channel information highlighted at the time of the alphanumeric key being released is selected as the desired channel for tuning. For example, if the shifting highlight box 13 indicates the highlighting of the channel number "267-3" when a continuous pressing of the alphanumeric key has ended, as in FIG. 2D, the controller 170 determines that the channel number "267-3" is selected for tuning. At this time, that is, upon release of the alphanumeric key, the controller 170 controls the signal receiving part 110 so that a broadcast signal of channel 267-3 is received. Then, as shown in FIG. 2E, the controller 170 may also control the OSD generating part 160 so that the channel selector 12 indicating the broadcast signal being received is displayed on the screen 10 of the displaying part 130.

FIGS. 3A-3E respectively illustrate steps of another channel selecting process performed according to an operation of the controller 170. In this instance, the selecting information comprises a letter and the channel information comprises a channel name having at least one letter. This process is performed in a manner analogous to that of FIGS. 2A-2E, and duplicative description may be omitted in the following.

Figure 3A:
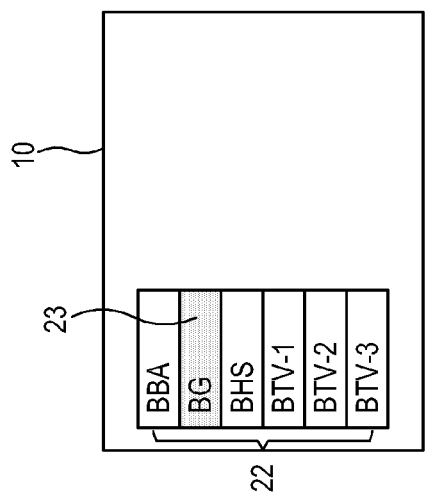
FIGS. 3A-3E are diagrams of sample screens of the displaying part of FIG. 1, respectively illustrating steps of another channel selecting process according to an embodiment of the present invention.

When the controller 170 determines an input of a letter corresponding to the pressed alphanumeric key, the controller 170 controls the OSD generating part 160 to generate OSD data for displaying a channel selector 22 as an OSD image on the screen 10 of the displaying part 130. In FIG. 3A, the pressed alphanumeric key corresponds to the letter "B," and the channel selector 22 displays the inputted letter.

Figure 3B:
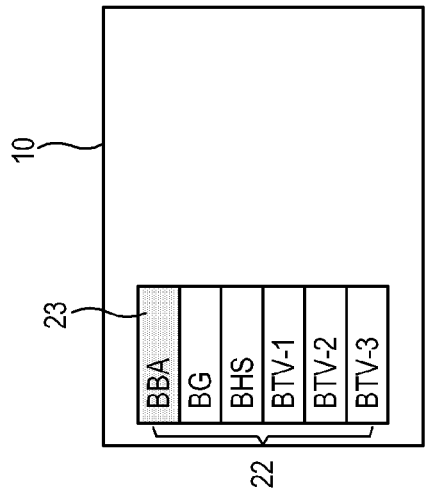

If the controller 170 determines that the pressed alphanumeric key is pressed and held for at least the duration of the first time period, the controller 170 may determine that the letter corresponding to the pressed alphanumeric key is being inputted as selecting information. After the passing of the first time period, the controller 170 searches the channel information stored in the information storing part 150, to retrieve channel information related to the letter of the pressed alphanumeric key. In this case, the retrieved channel information comprises channel names. In FIG. 3B, the retrieved channel information is displayed in the channel selector 22 as a list of items of channel information (channel names), including the channel information items of "BBA," "BG," "BHS," "BTV-1," "BTV-2," and "BTV-3," each of which is a channel name and relates to the letter"B" of the pressed alphanumeric key as shown in FIG. 3A. As shown, the channel information may include different major channel numbers, each of which may have minor channel numbers.

Figure 3C:
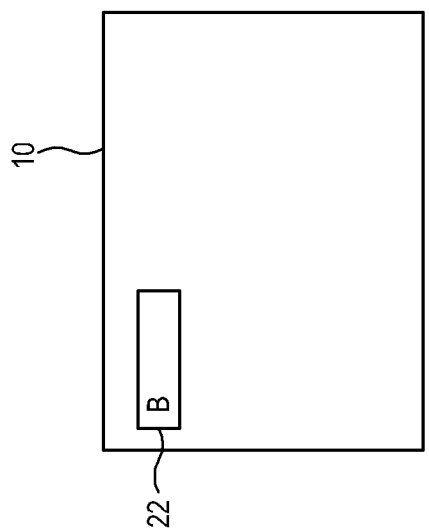
Figure 3D:
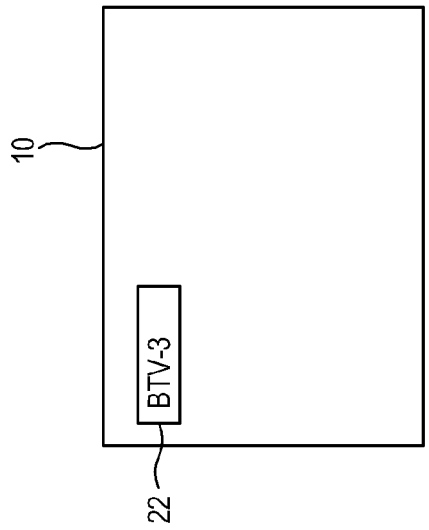

Referring to FIGS. 3B-3D, the controller 170 controls the OSD generating part 160 so that each of a plurality of channel names is sequentially highlighted by displaying the channel name in a shifting highlight box 23. Under the control of the controller 170, the channel name "BBA" is initially highlighted (FIG. 3B) and is displayed among the channel information items of the channel information search corresponding to the alphanumeric key ("B") that is pressed for the first time period. After the passing of the second time period, which begins as the first channel name is highlighted, the next channel name of the list of channel information items, namely, the channel name "BG," is highlighted under the control of the controller 170 (FIG. 3C). In the same way, the controller 170 continues to control the OSD generating part 160 so that all of the channel names of the displayed channel selector 12 are highlighted sequentially according to the continuous pressing of the same alphanumeric key. Here, the continuous pressing is achieved by pressing and holding the alphanumeric key corresponding to the letter "B," until the last channel name of the list of channel information items, namely, the channel name "BTV-3," is highlighted under the control of the controller 170 (FIG. 3D).

Figure 3E:
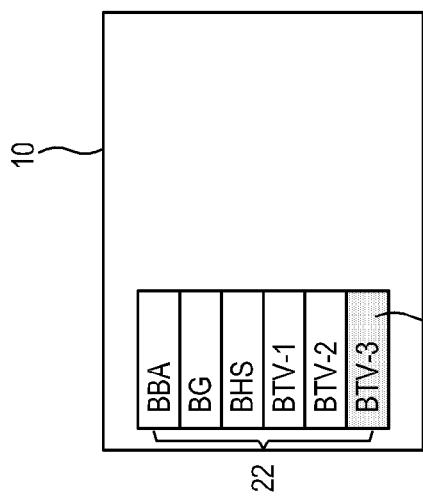

When the controller 170 detects the release of the alphanumeric key, the controller 170 determines that the channel name highlighted at the time of the release is selected as the desired channel for tuning. For example, if the shifting highlight box 23 indicates the highlighting of the channel name "BTV-3" when a continuous pressing of the alphanumeric key has ended, as in FIG. 3D, the controller 170 determines that the channel name "BTV-3" is selected for tuning and controls the signal receiving part 110 so that a broadcast signal of channel BTV-3 is received. FIG. 3E shows a state of the screen 10 after channel selection, wherein the channel selector 22 indicates the name of the broadcast signal being received.

Although the examples of FIGS. 2A-2E and 3A-3E show the inputted selecting information to be an initial digit of a channel number (FIG. 2A) or an initial letter of a channel name (FIG. 3A), the inputted selecting information may be any digit of a channel number or any letter of a channel name. To achieve this, the information storing part may, in addition to being configured to store channel information according to the initial digit/letter of each of a plurality of channel numbers/names, be further configured to store channel information according to each digit/letter making up the respective channel numbers/names. Such a configuration will enable a search of channel numbers/names based on any digit or letter of the stored channel information, to include for example a second digit/letter of a channel number/name, that is, rather than the first (initial) digit/letter. Thus, as in the above examples, the controller 170 will, in response to a determination that the pressed alphanumeric key is pressed and held for at least the duration of the first time period, perform a search for related channel information stored in the information storing part 150. In this case, the channel information items listed in the channel selector 12 or 22, i.e., the search results, will still be based on the inputted alphanumeric character, but the channel information items may differ according to the inputted alphanumeric character. For example, in the case of FIGS. 3B-3D, if the pressed alphanumeric key corresponded to the letter "T" instead of the letter "B," the list of channel information items displayed in the channel selector 22 would include "BTV-1," "BTV-2," and "BTV-3" but not "BBA," "BG," or "BHS."

Another example of a configuration of the storage of channel information in the information storing part 150 is where program genre information corresponding to the plurality of channels is included with the stored channel information. In this configuration, the search of the information storing part 150 is a program genre-based search and is based on the channel of the broadcast signal currently being received, i.e., at the time of pressing the alphanumeric key, rather than the key itself. That is, the pressed key may be any alphanumeric key, such that the search is performed irrespective of the number or letter of the alphanumeric key, or the pressed key may be a separate function key for executing the program genre-based search.

FIGS. 4A-4E respectively illustrate steps of another channel selecting process performed according to an operation of the controller 170. In this instance, the selecting information may comprise information of a function key in addition to or in lieu of that of an alphanumeric key. Here, the function key may be a search key. In the alternative, an alphanumeric key may serve as the search key. This process is also performed in a manner analogous to that of FIGS. 2A-2E, and duplicative description may be omitted in the following.

When the controller 170 determines an input of a search key, e.g., an alphanumeric key, the controller 170 controls the OSD generating part 160 to generate OSD data for displaying a channel selector 32 as an OSD image on the screen 10 of the displaying part 130. In FIG. 4A, the channel selector 32 displays an indication of the pressed search key. This indication may be the same as in FIG. 2A or 3A.

After the passing of the first time period, the controller 170 searches the channel information stored in the information storing part 150, to retrieve channel information related to the number of the pressed search key. In this case, the retrieved channel information comprises program titles. In FIG. 4B, the retrieved channel information is displayed in the channel selector 32 as a list of items of channel information (program titles), including the channel information items of "title 1," "title 2," "title 3," "title 4," "title 5," and "title 6," each of which is meant to represent an actual title of a broadcast program on one of six different channels. Here, each title relates to the time of the entry of the search key as shown in FIG. 4A, and importantly, to the program genre of the program of the currently viewed (currently tuned) channel.

Referring to FIGS. 4B-4D, the controller 170 controls the OSD generating part 160 so that each of a plurality of channel indicators is sequentially highlighted by displaying corresponding channel information in a shifting highlight box 33. Here, the respective channels of the channel information may be indicated (listed) by the title of a program currently broadcasted by the corresponding channel, by an indication of the channel itself, or by both. In the example of FIGS. 4A-4D, the channel information includes a plurality of program titles, namely, a title 1 through a title 6, which may correspond to first through sixth channels of the search results. In another example, the same channel information may be indicated using a corresponding channel number or name, in addition to or in lieu of program titles. In yet another example, the channel selector may be in the form of an EPG.

In an example operation, assuming a user were viewing a golf program on channel 7 at the time of pressing the search key, the controller would search the channel information stored in the information storing part 150, to retrieve channel information related to the program genre of the currently viewed golf program. Thus, the search would be based on a program genre of golf. On the other hand, if the currently viewed program (as in FIG. 4A) were a comedy program, the search would be based on a program genre of comedy. In any case, the user may then release the search key when the channel information item corresponding to title 6 is highlighted, so that a broadcast signal of the corresponding channel is received, as indicated in FIG. 4E.

Accordingly, the initial pressing of an alphanumeric key or search key on the remote controller or on the main body of the broadcast receiving apparatus 100 may constitute an input of first selecting information by the user and releasing of the same key may constitute an input of second selecting information by the user, and the first and second selecting information will ultimately select the specific channel for tuning. Furthermore, as described above, the duration of the pressing of the key may cause an indication of the plurality of channels to be displayed and may cause a change in the highlighting of a channel among the indicated plurality of channels.

Meanwhile, according to an embodiment of the present invention, the selecting information may be input using a plurality of alphanumeric keys, whereupon the controller 170 may control the signal receiving part 110 so that a broadcast signal having a channel number or name comprising the inputted numbers and/or letters is received. For example, if the numbers "2" and "6" are sequentially inputted, that is, without the first pressing exceeding the first time period, the controller 170 may control the signal receiving part 110 to receive a broadcast signal of channel 26, or if the letters "B" and "R" are similarly inputted, the controller 170 may control the signal receiving part 110 to receive a broadcast signal of channel BR.

The controller 170 may be realized with a computer program whereby the operations described above are programmed for execution. In this case, the broadcast receiving apparatus 100 may further comprise a microprocessor (not shown), such as a CPU, for executing the computer program; and a memory (not shown), such as a ROM and RAM, enabling the computer program to be stored and loaded.

Referring to FIG. 5, illustrating an operation of the broadcast receiving apparatus 100, the controller 170 detects a user input of a search key through the user inputting part 140 (S501). When the key is pressed, the controller 170 determines whether the input of the pressed key has been sustained during a first predetermined time (S502), and if not, the controller 170 returns to the step S501. If the controller 170 determines that the input of the pressed key has been sustained during the predetermined first time, the controller 170 controls the OSD generating part 160 and the signal processing part 120 so that the channel information corresponding to the pressed key, i.e., the search results, is displayed on the displaying part 130 (S503). After the channel information is displayed, as in FIG. 2B, 3B, or 4B, the controller 170 determines whether the input of the pressed key has been sustained during a second predetermined time (S504), and if so, the controller 170 controls the OSD generating part 160 and the signal processing part 120 to highlight a next item, that is, the channel information item after the currently highlighted item of channel information (S505). Otherwise, that is, when the controller 170 determines in the step S504 that the input of the pressed key has not been sustained during the predetermined second time, the controller 170 determines whether the input of selecting information is completed (S506), that is, whether the pressed key has been released, and if not, the operation returns to the step S504. Upon determining that the input of selecting information is completed, the controller 170 controls the signal receiving part 110 so that a broadcast signal of a channel corresponding to the current-highlighted item is received (S507).

As described above, according to the present invention, there is provided a method of receiving a broadcast signal and a broadcast receiving apparatus using the same, which enable a user to select a desired channel promptly and without difficulty. The user is allowed to see an indication of available channels that are corresponding to the user's selection of a digit of a channel number or a letter of a channel name for convenient selection of the desired channel, thereby facilitating a user's choice from among possibly hundreds of channel choices. Moreover, as provided, the method and apparatus enable the user to select another channel broadcasting a program of a genre corresponding to that of a currently viewed program.

Although embodiments of the present invention have been shown and described, it will be appreciated by those skilled in the art that changes may be made in these embodiments without departing from the principles and spirit of the inventive concept, the scope of which is defined in the appended claims and their equivalents.

What is claimed is:

1. A broadcast signal receiving apparatus, comprising:
a signal receiving part for receiving a broadcast signal;
an inputting part for selecting one of a plurality of broadcast channels, the inputting part including an alphanumeric key which is pressed to generate a first input and is released to generate a second input;
a displaying part for displaying, according to the first input, an indication of the plurality of broadcast channels; and
a controller, which receives the first and second inputs, to control the displaying part to sequentially display a series of individually highlighted channels of the plurality of broadcast channels, automatically while the alphanumeric key is pressed and held; to determine a time of receipt of the second input, the time of second input receipt coinciding with the highlighting of one of the series of individually highlighted channels; and to control the signal receiving part to tune to the broadcast channel highlighted at the time of the second input receipt.

2. The broadcast signal receiving apparatus according to claim 1, wherein the broadcast signal includes program genre information according to broadcast channel.

3. The broadcast signal receiving apparatus according to claim 2, further comprising:
an information storing part to store channel information corresponding to the plurality of broadcast channels, the channel information including the program genre information stored according to broadcast channel,
wherein, in response to the first input, the controller searches the information storing part for channel information corresponding to a program genre of a broadcast program of the received broadcast signal.

4. The broadcast signal receiving apparatus according to claim 1, wherein the broadcast signal includes electronic program guide.

5. The broadcast signal receiving apparatus according to claim 1, wherein the indication of the plurality of broadcast channels comprises channel numbers and titles of each of programs.

6. A content display apparatus, comprising:
   a data receiving part for receiving a plurality of contents;
   an inputting part for selecting one of the plurality of contents, the inputting part including an alphanumeric key which is pressed to generate a first input and is released to generate a second input;
   a displaying part for displaying, according to the first input, an indication of the plurality of contents; and
   a controller, which receives the first and second inputs, to control the displaying part to sequentially display a series of individually highlighted indication of the plurality of contents, automatically while the alphanumeric key is pressed and held; to determine a time of receipt of the second input, the time of second input receipt coinciding with the highlighting of one of the series of individually highlighted indication; and to control the signal receiving part to tune to the content highlighted at the time of the second input receipt.

7. The content display according to claim 6, wherein the indication of the plurality of contents includes program genre information according to the plurality of contents.

8. The content display according to claim 7, further comprising:
   an information storing part to store content information corresponding to the plurality of contents, the content information including the program genre information stored according to each of the plurality of contents,
   wherein, in response to the first input, the controller searches the information storing part for content information corresponding to a program genre of the content presently performed.

9. The content display according to claim 6, wherein each of the plurality of contents includes electronic program guide.

10. The content display according to claim 6, wherein the indication of the plurality of contents includes titles of each of the plurality of contents.

11. A broadcast signal receiving method comprising:
   receiving a broadcast signal;
   receiving a selection signal from an inputting part for selecting one of a plurality of broadcast channels, wherein the inputting part includes an alphanumeric key which is pressed to generate a first input and is released to generate a second input;
   displaying an indication of the plurality of broadcast channels according to the first input;
   sequentially displaying a series of individually highlighted channels of the plurality of broadcast channels, automatically while the alphanumeric key is pressed and held;
   determining a time of receipt of the second input, the time of second input receipt coinciding with the highlighting of one of the series of individually highlighted channels; and
   tuning the broadcast channel highlighted at the time of the second input receipt.

12. The broadcast signal receiving method according to claim 11, wherein the broadcast signal includes program genre information according to broadcast channel.

13. The broadcast signal receiving method according to claim 12, further comprising:
   storing channel information corresponding to the plurality of broadcast channels, the channel information including the program genre information stored according to broadcast channel; and
   searching channel information corresponding to a program genre of a broadcast program of the received broadcast signal, in response to the first input.

14. The broadcast signal receiving method according to claim 11, wherein the broadcast signal includes electronic program guide.

15. The broadcast signal receiving method according to claim 11, wherein the indication of the plurality of broadcast channels comprises channel numbers and titles of each of programs.

16. A content displaying method comprising:
   receiving a plurality of contents;
   receiving a selection signal from an inputting part for selecting one of the plurality of contents, the inputting part including an alphanumeric key which is pressed to generate a first input and is released to generate a second input;
   displaying an indication of the plurality of contents according to the first input;
   sequentially displaying a series of individually highlighted contents of the plurality of contents, automatically while the alphanumeric key is pressed and held;
   determining a time of receipt of the second input, the time of second input receipt coinciding with the highlighting of one of the series of individually highlighted contents; and
   performing the content highlighted at the time of the second input receipt.

17. The content displaying method according to claim 16, wherein the indication of the plurality of contents includes program genre information according to the plurality of contents.

18. The content displaying method according to claim 17, further comprising:
   storing content information corresponding to the plurality of contents, the content information including the program genre information stored according to the plurality of contents; and
   searching channel information corresponding to a program genre of the content presently performed, in response to the first input.

19. The content displaying method according to claim 16, wherein each of the plurality of contents includes electronic program guide.

20. The content displaying method according to claim 16, wherein the indication of the plurality of contents includes titles of each of the plurality of contents.

* * * * *